United States Patent [19]

Tomalia et al.

[11] Patent Number: 4,599,400
[45] Date of Patent: Jul. 8, 1986

[54] STAR/COMB-BRANCHED POLYAMIDE

[75] Inventors: Donald A. Tomalia; Mark J. Hall, both of Midland, Mich.

[73] Assignee: The Dow Chemical Company, Midland, Mich.

[21] Appl. No.: 683,299

[22] Filed: Dec. 18, 1984

[51] Int. Cl.$^4$ ............................................. C08G 69/00
[52] U.S. Cl. ................................. 528/405; 528/397; 528/403
[58] Field of Search ...................... 528/405, 403, 397

[56] References Cited

U.S. PATENT DOCUMENTS 3,575,890  4/1971  Litt et al. ........................... 528/405
4,435,548  3/1984  Tomalia et al. ..................... 528/363
4,507,466  3/1985  Tomalia et al. ..................... 528/363

Primary Examiner—Harold D. Anderson

[57] ABSTRACT

Star/comb-branched polyamides having good resistance to degradation upon exposure to shear are prepared by reacting polyvalent core compounds such as tribromoneopentyl alcohol with an oxazoline such as 2-ethyl-2-oxazoline to provide the desired polyamide. The polyamides are readily hydrolyzed with acid such as hydrochloric acid to form star/comb-branched polyamines. The polyamides and the polyamines are useful as viscosity enhancing agents in such applications as paints, mobility control agents and hydraulic fluids.

6 Claims, No Drawings

STAR/COMB-BRANCHED POLYAMIDE

BACKGROUND OF THE INVENTION

This invention relates to star-branched and comb-branched polyamides, star-branched and comb-branched polyamine derivatives thereof and to methods for their preparation.

Water-soluble polyamines and polyamides are known to be effective thickeners or viscosity modifiers for aqueous media. For example, acrylamide polymers and polyalkylenepolyamines such as polyethyleneimine have been employed extensively as thickeners for aqueous hydraulic fluids and fluid mobility control agents in secondary oil recovery. Hydrocarbon-soluble polyamides and polyamines have been used as viscosity modifiers and dispersants in lubricants. Unfortunately, however, such polymers often degrade when solutions of the polymers are subjected to a high degree of shear as is often the case in many applications for viscous aqueous fluids and hydrocarbon lubricants.

Therefore, it would be highly desirable to provide a polyamide and a polyamine derivative thereof which acts as a viscosity enhancer in aqueous and hydrocarbon fluids and which resists degradation upon exposure to high degrees of shear.

SUMMARY OF THE INVENTION

In one aspect, the present invention is such a polymer comprising a star/comb-branched polyamide which polyamide has a plurality of branches emanating from a core with each branch having a plurality of amide moieties in the branch wherein each amide nitrogen is in the backbone or chain of the branch and bears a pendant carbonyl moiety and which amide moiety can be hydrolyzed to form an amine moiety without cleavage of the backbone of the branch. Such star/comb-branched polymers are soluble in aqueous and/or hydrocarbon liquids and have sufficient molecular weight to measurably increase the viscosity of the liquid when dissolved therein. For the purposes of this invention, a star/comb-branched polymer is one having at least three branches emanating from a single core as in classical star-branched polymers or at least three branches pendant from a linear or substantially linear backbone as in classical comb-branched polymers.

In another aspect, this invention is the star/comb-branched amine derivative of the aforementioned star/comb-branched polyamide.

In another aspect, this invention is a method for making a water-soluble star/comb-branched polyamide comprising contacting a core compound or a linear polymer having a plurality of electrophilic moieties with a 2-substituted-2-oxazoline or a 2-substituted-2-oxazine in an amount and under conditions sufficient to cause the oxazoline or oxazine moiety to react with a plurality of the electrophilic moieties of the core compound thereby causing ring-opening polymerization of the oxazoline or oxazine moieties to form the desired water-soluble star/comb-branched polyamide.

The star-branched polyamides and polyamines of the present invention are readily employed as viscosity enhancing agents in such applications as paint thickeners, hydraulic fluids, mobility control agents and fracturing fluids in oil recovery applications, and lubricants.

DETAILED DESCRIPTION OF THE INVENTION

The star/comb-branched polyamides and polyamines of the present invention are polymers having at least 3 core branches emanating from a core or polymer. The core branches are of sufficient length and contain sufficient amide or amine moieties to make the star-branched polymer water-soluble and to enable it to perform as a viscosity increasing agent when added to an aqueous medium.

Preferred star/comb-branched polyamides are represented by the formula

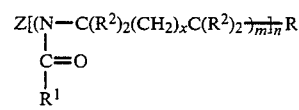

wherein Z is the residue of the core compound or polymer backbone; $R^1$ is hydrocarbyl such as aryl, alkyl or arylalkyl; each $R^2$ is individually hydrogen or hydrocarbyl; m is a number from 2 to 1000; each R is a chain-terminating group; x is 0 or 1; and n is a whole number from 3 to 100. In preferred star-branched polyamides, Z is an n-valent hydrocarbon radical such as

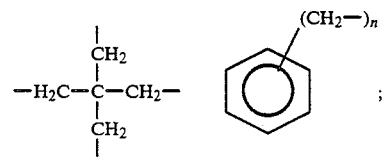

each $R^1$ is alkyl, alkylaryl or aryl having from 1 to 20 carbons; and each $R^2$ is hydrogen. In comb-branched polymers, $R^1$ and $R^2$ are as defined before and Z is an n-valent polymer backbone such as

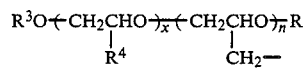

or

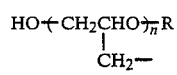

wherein $R^3$ is the residue of a polyether polyol initiator, $R^4$ is hydrogen or $C_1$–$C_3$ alkyl, R is as defined hereinbefore, and x is a whole number from 3 to 100. Preferably, n is a whole number from 3 to 20 and m is a whole number from 2 to 1000. The star/comb-branched polyamines are represented by the formula

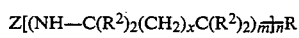

wherein Z, $R^2$, R, m, x and n are as defined hereinbefore.

The star/comb-branched polymers of this invention are readily prepared by reacting a compound capable of generating a polyvalent core or polymer backbone, e.g., $ZX_n$ wherein X is halo, sulfonyl halide, sulfonate ester or triflate ester, and Z and n are as defined hereinbefore, with a compound having an oxazoline or oxazine moiety, e.g.,

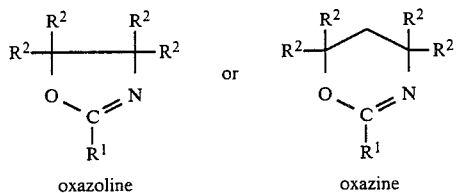

oxazoline          oxazine wherein $R^1$ and $R^2$ are as defined hereinbefore, under conditions sufficient to cause the oxazoline or oxazine ring to undergo a ring-opening reaction to form

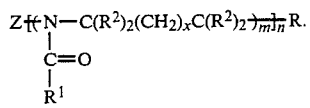

Advantageously, the degree of polymerization of this polymer, which is equivalent to m, is controlled by the molar ratio of the oxazoline or oxazine compound to the core-generating compound. For example, when m is 3 and n is 3, then the molar ratio of the oxazoline or oxazine compound to the core-generating compound employed is in the range from about 9:1 to about 14:1. If, however, it is desirable to provide a compound having a degree of polymerization where m equals 6 and n is equal to 3, then the molar ratio of the oxazoline or oxazine compound to the core- or backbone-generating compound is from about 18:1 to about 27:1. In general, the molar ratio of the oxazoline or oxazine compound to the core- or backbone-generating compound is at least about 1.5 (m×n) most preferably at least about 2 (m×n).

Representative preferred core- and backbone-generating compounds include polyhalohydrocarbons having a number of reactive halo groups corresponding to n which halo groups are available for reaction with an oxazoline moiety. Examples of such polyhalohydrocarbons include tetra(halomethyl)methane, tetra(bromomethyl)methane, hydroxymethyltri(bromomethyl)methane, 1,2,3,4,5,6-hexa(bromomethyl)benzene, 1,3,5-tri(bromomethyl)-2,4,6-trimethyl benzene, polyallyl halides such as polyallyl bromide, polyallyl chloride and copolymers of allyl bromide and ethylene. Other preferred core- and backbone-generating compounds include polytosylhydrocarbons and polytrifylhydrocarbons having a number of tosyl or triflate groups corresponding to n which tosyl or triflate groups are available for reaction in an oxazoline moiety. Examples of such polytosyl- and polytrifylhydrocarbons include tetra(tosylmethyl)methane, tetratetra(trifylmethyl)methane, polyglycidol pertosylates, polyglycidol copolymer pertosylates, polyvinyl alcohol pertosylates and pertriflates. In general, multifunctional core- or backbone-generating compounds having three or more (n>3) moieties which are able to undergo nucleophilic replacement by the oxazoline nitrogen to generate oxazolinium cations or initiator sites are employed. It is preferred that the chemical bond resulting from this oxazoline replacement reaction be stable to (i.e., resist) acid or alkaline hydrolysis. Of the foregoing core- and backbone-generating compounds, the halides such as bromides and iodides are more preferred, with the tosylates and the triflate esters being the most preferred.

Representative oxazoline compounds that may be suitably employed in the practice of this invention include 2-alkyloxazolines such as 2-methyloxazoline, 2-ethyloxazoline and 2-propyloxazoline; other alkyloxazolines such as 2,4-dimethyloxazoline, 2,5-dimethyloxazoline, 2,4,5-trimethyloxazoline and the like; hydroxyalkyloxazolines such as 2-hydroxymethylethyloxazoline; haloalkyloxazolines such as 2-(chloromethyl)oxazoline and 2-(1,1-dichloroethyl)oxazoline; and aryloxazolines such as 2-phenyloxazoline and 2-(p-tolyl)oxazoline. Of the foregoing oxazolines, the 2-methyl-, 2-ethyl-, 2-phenyl- and 2-hydroxymethylethyloxazolines are preferred, with the 2-ethyloxazoline being the most preferred. Representative oxazine compounds are those which correspond in all other respects to the aforementioned oxazoline compounds. Of the oxazine compounds, the 2-methyl-, 2-ethyl-, 2-phenyl- and 2-hydroxymethylethyloxazines are preferred, with the 2-ethyloxazines being the most preferred.

The reaction to prepare the desired star/comb-branched polyamide is carried out by contacting the core- or backbone-generating compound with the oxazoline or oxazine compound in the presence of potassium iodide or other similar catalysts under conditions as described in U.S. Pat. No. 4,261,925 (1981). Preferably, the reaction is carried out at temperatures in the range from about 50° C. to about 150° C., and may be effected under neat conditions or in a solvent such as dimethylformamide or another non-reactive, but polar solvent. The resulting polyamide can be readily recovered by conventional means as illustrated in the examples set forth hereinafter. When $R^1$ is $C_1$–$C_3$ alkyl or hydroxyalkyl, the resulting polyamide is a water-soluble polymer exhibiting use as a viscosity enhancer when dissolved in aqueous media. When $R^1$ is a $C_4$ or higher alkyl or aryl, the polymer is generally soluble in organic liquids such as hydrocarbons. However, upon hydrolysis to amines, the lipophilic polyamides are converted to water-soluble polyamines.

The polyamide is readily converted to polyamine by contacting the polyamide with strong acid such as hydrochloric or sulfuric acid under conditions sufficient to hydrolyze the amide groups, thereby forming the amine. The conditions employed for this hydrolysis are those well-known in the art for the hydrolysis of amides to amines such as described by K. M. Kem, *J. Polym. Sci.*, 17, 1977–1990 (1979). Preferably, however, the hydrolysis is carried out using a strong acid such as hydrochloric acid or sulfuric acid in concentrations from about 6N (normal) to about 12N and at temperatures in the range from about 50° C. to about 125° C. When total hydrolysis is desired, the total acid employed is preferably from about 1.1 to about 1.5 equivalents of acid per equivalent of amide moiety in the polymer. It is further understood that partial hydrolysis of the amide can be achieved by employing less acid on a mole basis than is required to hydrolyze all of the amide moieties, for example, about 1.3X equivalents of acid per equivalent of amide wherein X is equal to the mole percent of hydrolysis desired. The resulting polyamines are also very water-soluble and are useful as viscosity enhancers for aqueous compositions such as paints, lubricants and liquids used in secondary oil recovery applications. More importantly, such polyamines are especially useful as core-generating compounds in the preparation of dendritic polymers such as described in patent application Ser. No. 456,226, filed Jan. 7, 1983.

The following examples are given to illustrate the invention and should not be construed as limiting its scope. All parts and percentages in the following examples are by weight unless otherwise indicated.

EXAMPLE 1

Preparation of Star-Branched Polyamide

An 85-g (0.86 mole) portion of 2-ethyl-2-oxazoline is combined with 9.6 g (0.029 mole) of tribromoneopentyl alcohol (hydroxymethyltribromomethylmethane) and 1.4 g of potassium iodide in a 3-necked flask equipped with a reflux condenser, stirrer and heating mantle. The reaction mixture is heated with stirring at 90° C. while protecting the mixture from moisture with a calcium chloride drying tube. The reaction mixture is heated at 90° C. to 100° C. for a period of 50 hours to produce an orange amber glassy mass which flows at 125° C. and which is very water-soluble. This glassy, brittle polymer is ground into a tan colored powder and dissolved in methylene chloride at a ratio of 4.5 g of polymer in 30 ml of methylene chloride. This solution is slowly poured into 80 ml of diethyl ether while stirring with a magnetic stirrer. Initially, a light tan solid precipitates and then becomes a syrupy gum after the entire methylene chloride solution is added. The cloudy supernatant is decanted leaving a syrupy residue which is then redissolved in 25 ml of methylene chloride. Half of this solution is added dropwise while stirring to 80 ml of diethyl ether. A light colored solid precipitates and is filtered and washed with two 10-ml portions of diethyl ether. This polymer has a softening point of 83° C. to 91° C. Analysis of this sample by nuclear magnetic resonance and infrared spectroscopy indicates a star-shaped structure having polyamide moieties in the branches. Size exclusion chromatography indicates that this polymer is quite polydispersed which is probably due to the presence of star-branched polymers having branches with a wide range of degree of polymerization. A monodispersed component is noted at longer elution times which is believed to be a small amount of homopolymer.

EXAMPLE 2

Preparation of Star-Branched Polyamide

An 8.76-g (0.0217 mole) portion of 1,3,5-tribromomethylmesitylene is dissolved in 203.77 g (2.79 mole) of dimethylformamide and charged to a 1-liter, 3-necked round-bottom flask equipped with a reflux condenser and a stirrer. To this solution is added 83.198 g (0.98 mole) of 2-methyloxazoline. The ratio of initiator, i.e., 1,3,5-tribromomesitylene, to the methyloxazoline is 1 mole of initiator per 45 moles of methyloxazoline. The reaction mixture is then heated from ambient temperature to 45° C. and maintained at this temperature while monitoring the progress of the reaction with size exclusion chromatography. Within a few minutes after all reactants are mixed, a white precipitate is observed to form. Within 2.5 hours, the reaction is clear and samples of the resulting yellowish solution are withdrawn and analyzed. After approximately 7 hours, the reaction is nearing 50 percent completion and is terminated. Termination of the reaction is accomplished by vacuum distilling all volatiles away from the polymeric residue. Distillation is performed at a maximum temperature of 65° C. and a maximum vacuum of 2 mm of mercury. The resulting polymer is analyzed by size exclusion chromatography and determined to contain a significant quantity of trapped dimethylformamide. To remove this residual dimethylformamide, the residue is dissolved in methylene chloride at a ratio of 1 g of residue in 6 ml of methylene chloride and precipitated by slowly dropping this solution into 200–300 ml of diethyl ether. The polymer immediately precipitates from solution and is filtered and dried overnight in a vacuum oven. The resulting crystalline polymer is analyzed by scanning electron chromatography and for carbon 13 structure confirmation using nuclear magnetic resonance. These analyses indicate a star-branched polyamide having a degree of polymerization such that m equals 8 to 15.

EXAMPLE 3

Preparation of a Star-Branched Polyamine

The star-branched polyamide of Example 2 is hydrolyzed to a star-branched polyamine by the following procedure. A 5.8-g ($1.37 \times 10^{-3}$ mole) portion of the polyamide of Example 2 is combined with 10.5 g of 36 percent hydrochloric acid in water. A mild exotherm is noted upon combination and the reaction mixture is heated at reflux for 3 hours after which time a white solid product is observed. After a total reflux time of 5 hours, the reaction product is dissolved in 20 ml of deionized water. Sufficient hydroxide form of an ion-exchange resin is added to the reaction mixture to increase the pH of the mixture to about 8. The recovered amber colored syrup weighs 3.89 g wherein theoretical weight for total hydrolysis is 3.16 g. Therefore, it is assumed that the star-branched polyamide is approximately 72 percent hydrolyzed to the polyamine. Nuclear magnetic resonance analysis of the resulting mixture indicates a somewhat higher degree of hydrolysis and nuclear magnetic resonance and infrared spectroscopy as well as size exclusion chromatography confirm the star-branched character of the polyamine.

EXAMPLE 4

Preparation of a Comb-Branched Polyamide

A butanol-initiated copolymer of propylene oxide and glycidol represented by the formula:

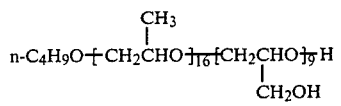

is prepared by reacting 16 moles of propylene oxide with 9 moles of t-butylglycidyl ether in the presence of 1 mole of butanol at 50° C. The copolymer has a molecular weight of 1594 as determined by fast atom bombardment mass spectroscopy and an equivalent weight of 177.

A 4.43-g portion (25 milliequivalents (meq)) is dissolved in 25 ml of dry methylene chloride and cooled to 0° C. To this solution are added 9.54 g (50.0 meq) of tosyl chloride and 8.0 g (100 meq) of pyridine in 25 ml of methylene chloride which has been pre-cooled to 0° C. The resulting slightly orange homogeneous solution is stirred for one hour while cooling in an ice bath. The reaction vessel containing the solution is tightly stoppered and stored at 4° C. for 7 days. After the storage period, a 1.97-g portion of pyridine hydrochloride crystals are removed from the solution by filtration. The filtrate, is then poured into 50 ml of an ice bath, stirred and then transferred to a separatory funnel. The organic layer is washed with two 25-ml portions of 50 percent hydrochloric acid (25° C.) and then with a 25-ml portion of water (25° C.). The washed organic layer is dried over anhydrous $Na_2SO_4$ and solvent is removed via rotary evaporator ($\leq 50°$ C.) to provide 10.02 g of a viscous brown oil which is shown by infrared analysis to be a tosylate of the copolymer. The tosylate copolymer is further purified by dissolving it in diethyl ether (30 ml) and then extracting it with two 50-ml portions of a saturated solution of $NaHCO_3$. The organic layer is separated, dried over anhydrous $Na_2SO_4$ for 2 hours, filtered and devolatilized to provide 8.56 g of a clear orange-brown viscous liquid which is determined by infrared analysis to be a totally tosylated form of the copolymer (pertosylated copolymer).

The pertosylated copolymer is divided into several portions and each is reacted with an amount of 2-ethyl-2-oxazoline (dried over molecular sieves to 16 μg $H_2O$/ml) as indicated in Table I. The following procedure is used to carry out the reaction. The entire reaction apparatus is dried at 125° C. for at least 15 minutes and then cooled in a dry nitrogen stream. A 0.30-ml portion of a solution of pertosylated copolymer in dry methylene chloride (0.1 g/ml) is injected into a capped 20-ml serum vial. For each sample, an appropriate volume of the solution is transferred to a dry 20-ml ampoule and the methylene chloride is removed using a stream of dry nitrogen to leave the pertosylated copolymer in the ampoule which is then capped with a serum cap. A 2-ml portion of dry, purified oxazoline is added through the serum cap to each ampoule. The ampoules are cooled in methylene chloride/dry ice bath evacuated to <25 Torr, back-flushed with nitrogen and flame sealed. The ampoules are placed in an oil bath heated to 150° C. and maintained there for 40 hours.

TABLE I

| Sample No. | Monomer: Initiator Mole Ratio | Oxazoline, g (moles) | Initiator, g (moles) |
|---|---|---|---|
| 1 | 500 | 2 (2.02 × 10$^{-3}$) | 0.12 (4.04 × 10$^{-5}$) |
| 2 | 1000 | 2 (2.02 × 10$^{-3}$) | 0.06 (2.02 × 10$^{-5}$) |
| 3 | 2000 | 2 (2.02 × 10$^{-3}$) | 0.03 (1.01 × 10$^{-5}$) |
| 4 | 4000 | 2 (2.02 × 10$^{-3}$) | 0.015 (5.05 × 10$^{-6}$) |
| 5 | 5000 | 2 (2.02 × 10$^{-3}$) | 0.0075 (2.52 × 10$^{-6}$) |

The ampoules are opened by cooling in dry ice, thus causing the polymer product to contract from the glass walls of the ampoules and to break the ampoules in some cases. The polymer product is separated from the glass, placed in aluminum trays, heated at 160° C. and 8 Torr for 15 minutes and then reweighed. Based on weight loss determinations, the polymerizations are found to be complete to form comb-branched polyamides.

Solutions are prepared of each of the polymers (0.25 percent of the polymer in water containing potassium phosphate monobasic buffer (pH=7)). Using size exclusion chromatography, the molecular weights of the comb-branched polyamides are as follows:

TABLE II

| Sample No. | Mw (× 10$^{-4}$) | Mn (× 10$^{-4}$) |
|---|---|---|
| 1 | 2.53 | 1.89 |
| 2 | 4.15 | 2.68 |
| 3 | 1.40 | 51.12 |
| 4 | 2.73 | 87.0 |
| 5 | 3.62 | 102.0 |

The comb-branched polyamides of Sample Nos. 4 and 5 are dissolved in water at concentrations ranging from 2.6 percent to 10 percent and subjected to shear rates ranging from 192 to 2693 sec$^{-1}$ using a Haake Viscometer, Model RV-21 operating at 25° C. Under such shearing conditions, the solutions exhibit a loss of viscosity of less than 10 percent of original non-sheared viscosity. The shear thinning at high shear rates that is observed is not permanent, but returns to original viscosity at lower shear rates.

What is claimed is:

1. A star/comb-branched polyamide having at least 3 branches emanating from the residue of a core compound wherein each branch has a plurality of amide moieties in which each such amide moiety has its amide nitrogen in the chain of the branch and each such amide nitrogen bears a pendant carbonyl moiety, said amide moieties being hydrolyzable to form amine moieties without cleaving the chain of the branch.

2. The polyamide of claim 1 which is represented by the formula

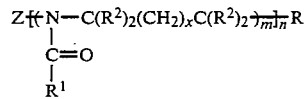

wherein Z is the residue of the core compound, each $R^1$ is independently hydrocarbyl, each $R^2$ is independently hydrogen or hydrocarbyl, R is a chain-terminating group, m is a whole number from 2 to 1000, x is 0 or 1 and n is a whole number from 3 to 100.

3. The polyamide of claim 2 wherein Z is an n-valent hydrocarbon radical, each $R^1$ is independently alkyl, aryl or alkylaryl having from 1 to 20 carbons, each $R^2$ is hydrogen, x is 0 and n is a whole number in the range from 3 to 20.

4. A star-branched polyamide of claim 3 wherein Z is

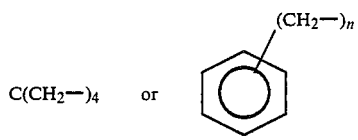

wherein n is from 3 to 6 and R is hydrogen or alkyl.

5. A comb-branched polyamide of claim 2 wherein Z is

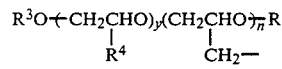

or

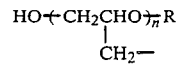

wherein $R^3$ is the residue of a polyether polyol initiator, $R^4$ is hydrogen or $C_1$–$C_3$ alkyl, R is a chain-terminating group, n is a whole number from 3 to 20 and y is a whole number from 3 to 100.

6. The polyamide of claim 2 wherein Z is $C(CH_2-)_4$,

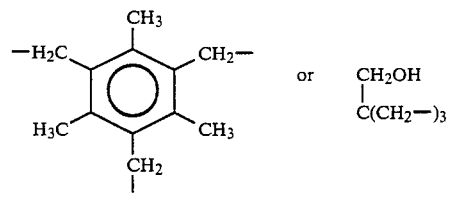

each $R^1$ is methyl, ethyl or propyl, each $R^2$ is hydrogen, X is 0, and m is a whole number from 2 to 1000.

* * * * *